(12) United States Patent
Li et al.

(10) Patent No.: US 9,843,274 B2
(45) Date of Patent: Dec. 12, 2017

(54) THREE-LEVEL PHOTOVOLTAIC INVERTER PULSE WIDTH MODULATION METHOD AND MODULATOR

(71) Applicant: SUNGROW POWER SUPPLY CO., LTD., Hefei, Anhui (CN)

(72) Inventors: Xiaoxun Li, Hefei (CN); Zhiqiang Han, Hefei (CN); Haoyuan Li, Hefei (CN); Xiaodong Mei, Hefei (CN); Benhe Yang, Hefei (CN); Kai Shen, Hefei (CN)

(73) Assignee: SUNGROW POWER SUPPLY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/315,128

(22) PCT Filed: May 8, 2015

(86) PCT No.: PCT/CN2015/078540
§ 371 (c)(1),
(2) Date: Nov. 30, 2016

(87) PCT Pub. No.: WO2016/029714
PCT Pub. Date: Mar. 3, 2016

(65) Prior Publication Data
US 2017/0201189 A1  Jul. 13, 2017

(30) Foreign Application Priority Data
Aug. 27, 2014  (CN) .......................... 2014 1 0428123

(51) Int. Cl.
*H02M 7/5395* (2006.01)
*H02S 40/32* (2014.01)
(Continued)

(52) U.S. Cl.
CPC ........ *H02M 7/5395* (2013.01); *H02H 7/1225* (2013.01); *H02M 1/083* (2013.01); *H02S 40/32* (2014.12); *H02M 2001/0048* (2013.01)

(58) Field of Classification Search
CPC ...... H02M 1/08; H02M 1/084; H02M 1/0845; H02M 1/12; H02M 2001/123; H02M 1/32;
(Continued)

(56) References Cited

U.S. PATENT DOCUMENTS 8,649,195 B2 * 2/2014 Mao ...................... H02M 7/493
  363/71
8,995,159 B1 * 3/2015 Carr .......................... H02J 3/18
  363/10

(Continued)

FOREIGN PATENT DOCUMENTS

CN  101814855 A  8/2010
CN  102255331 A  11/2011
(Continued)

OTHER PUBLICATIONS

International Search Report corresponding to Application No. PCT/CN2015/078540; dated Aug. 14, 2015, with English translation.
(Continued)

*Primary Examiner* — Jeffrey Sterrett
(74) *Attorney, Agent, or Firm* — Cantor Colburn LLP

(57) ABSTRACT

A three-level photovoltaic inverter pulse width modulation method and a three-level photovoltaic inverter pulse width modulator. The method includes: when it is detected that potential safety hazards exist in a three-level photovoltaic inverter, switching the pulse width modulation mode of the three-level photovoltaic inverter into a 13-vector space vector pulse width modulation mode, to solve the fault or abnormal problems in the three-level photovoltaic inverter
(Continued)

such as midpoint potential offset or excessively large common mode leakage current formed when the ground stray capacitance of a photovoltaic assembly is large, wherein according to the 13-vector SVPWM mode, 12 short vectors in 27 on-off state vectors of the three-level photovoltaic inverter are abandoned, and only six long vectors, six middle vectors and three zero vectors are reserved.

11 Claims, 12 Drawing Sheets

(51) Int. Cl.
*H02M 1/08* (2006.01)
*H02H 7/122* (2006.01)
*H02M 1/00* (2006.01)

(58) Field of Classification Search
CPC ........... H02M 2001/325; H02M 7/537; H02M 7/5387; H02M 2007/53876
USPC ....... 363/41, 43, 56.02, 56.03, 56.04, 56.05, 363/98
See application file for complete search history.

(56) References Cited

U.S. PATENT DOCUMENTS

| | | | | |
|---|---|---|---|---|
| 2011/0109285 A1* | 5/2011 | El-Barbari | ............ | H02M 7/487 323/282 |
| 2011/0115532 A1* | 5/2011 | Roesner | ................ | H02M 7/487 327/136 |
| 2011/0141786 A1* | 6/2011 | Shen | ..................... | H02M 7/487 363/131 |
| 2011/0175662 A1* | 7/2011 | Said El-Barbari | ........................ | H01L 31/02021 327/319 |
| 2012/0281442 A1* | 11/2012 | Revelant | ............... | H02M 7/487 363/40 |
| 2012/0320650 A1* | 12/2012 | Weinmann | ............ | H02P 27/085 363/132 |
| 2014/0009988 A1* | 1/2014 | Valiani | .................. | H02M 7/487 363/131 |
| 2014/0334206 A1* | 11/2014 | Valiani | .................. | H02M 7/487 363/97 |
| 2015/0188401 A1* | 7/2015 | Zheng | ..................... | H02M 1/00 363/95 |
| 2015/0263644 A1* | 9/2015 | Fu | .......................... | H02M 7/487 363/95 |
| 2017/0201189 A1* | 7/2017 | Li | ........................ | H02M 7/5395 |

FOREIGN PATENT DOCUMENTS

| | | |
|---|---|---|
| CN | 102355153 A | 2/2012 |
| CN | 103023364 A | 4/2013 |
| CN | 103138619 A | 6/2013 |
| CN | 103607129 A | 2/2014 |
| CN | 104158429 A | 11/2014 |
| EP | 1511168 A2 | 3/2005 |
| JP | 4826730 B2 | 11/2011 |

OTHER PUBLICATIONS

Jing-hua Zhou et al., "Research on Multi-level Inverter Discontinuous Space Vector Modulation Strategies" China Academic Publishing House, vol. 39, No. 5, Oct. 2005, 3 pages.

Shao, Zhangping: "Research on the Key Issues for Three-level AC-DC-AC Converter System", Master Dissertation of Hefei University of Technology, Dec. 31, 2013 (Dec. 31, 2013), pp. 34-47.

Xing Zhang et al., "Research Three-level Discontinuous Pulse Width Modulation Strategy" China Academic Journal Electronic Publishing House, vol. 47, No. 10, Oct. 2013, 3 pages.

* cited by examiner

THREE-LEVEL PHOTOVOLTAIC INVERTER PULSE WIDTH MODULATION METHOD AND MODULATOR

The present disclosure is the national phase of International Application No. PCT/CN2015/078540, titled "THREE-LEVEL PHOTOVOLTAIC INVERTER PULSE WIDTH MODULATION METHOD AND MODULATOR", filed on May 8, 2015, which claims priority to Chinese Patent Application No. 201410428123.5, titled THREE-LEVEL PHOTOVOLTAIC INVERTER PULSE WIDTH MODULATION METHOD AND MODULATOR", filed with the State Intellectual Property Office of People's Republic of China on Aug. 27, 2014, both of which are incorporated herein by reference in entirety.

TECHNICAL FIELD

The present disclosure relates to the field of power electronic technology, and in particular to a pulse width modulation method and a pulse width modulator for a three-level photovoltaic inverter.

BACKGROUND

A Space Vector Pulse Width Modulation (SVPWM) is a novel pulse width modulation for a three-level photovoltaic inverter. The SVPWM has many advantages, such as an improved harmonic spectrum of an output waveform and an increased utilization ratio of a direct current bus voltage, and thus is widely adopted.

However, the three-level photovoltaic inverter in the SVPWM mode is easy to have faults or abnormal problems (such as a midpoint potential offset or an excessively large common mode leakage current formed when a ground stray capacitance of a photovoltaic assembly is large), thereby affecting safety and stability of operation of a grid-connected photovoltaic system.

SUMMARY

In a view of the above, the present application provides a pulse width modulation method and a pulse width modulator for a three-level photovoltaic inverter, for solving the faults or abnormal problems in the three-level photovoltaic inverter (such as a midpoint potential offset or an excessively large common mode leakage current formed when a ground stray capacitance of a photovoltaic assembly is large).

A pulse width modulation method for a three-level photovoltaic inverter includes:

switching a pulse width modulation mode of a three-level photovoltaic inverter to a 13-vector space vector pulse width modulation (SVPWM) mode in a case of detecting that potential safety hazards exist in the three-level photovoltaic inverter.

The 13-vector SVPWM mode is a SVPWM mode in which 12 short ones of 27 on-off state vectors of the three-level photovoltaic inverter are discarded and only 6 long vectors, 6 middle vectors and 3 zero vectors are reserved.

The detecting that the potential safety hazards exist in the three-level photovoltaic inverter, includes detecting that an effective value of a common mode leakage current of the three-level photovoltaic inverter is greater than a first threshold.

Optionally, after the switching the pulse width modulation mode of the three-level photovoltaic inverter to the 13-vector SVPWM mode, the method further includes:

switching the pulse width modulation mode of the three-level photovoltaic inverter to a discontinuous SVPWM mode in a case of detecting that the effective value of the common mode leakage current of the three-level photovoltaic inverter is not greater than a second threshold. The second threshold is not greater than the first threshold.

Optionally, before the switching the pulse width modulation mode of the three-level photovoltaic inverter to the 13-vector SVPWM mode in the case of detecting that the potential safety hazards exist in the three-level photovoltaic inverter, the method further includes:

triggering the three-level photovoltaic inverter to shut down for protection in a case of detecting that the common mode leakage current value of the three-level photovoltaic inverter is greater than a third threshold.

The detecting that the potential safety hazards exist in the three-level photovoltaic inverter, includes detecting that an amplitude of a voltage on line side of the three-level photovoltaic inverter is less than a threshold for a low voltage ride-through.

Optionally, after the switching the pulse width modulation mode of the three-level photovoltaic inverter to the 13-vector SVPWM mode, the method further includes:

switching the pulse width modulation mode of the three-level photovoltaic inverter to the discontinuous SVPWM mode in a case of detecting that an amplitude of the voltage on line side of the three-level photovoltaic inverter is not less than the threshold for the low voltage ride-through.

The discontinuous SVPWM mode includes a first discontinuous SVPWM mode, a second discontinuous SVPWM mode, a third discontinuous SVPWM mode or a fourth discontinuous SVPWM mode.

In the first discontinuous SVPWM mode, when a space vector corresponding to an instantaneous output voltage of the three-level photovoltaic inverter is rotated to a first big sector, a C-phase amplitude of the three-level photovoltaic inverter is always clamped to $-V_{dc}/2$; when the space vector is rotated to a second big sector, a B-phase amplitude of the three-level photovoltaic inverter is always clamped to $V_{dc}/2$; when the space vector is rotated to a third big sector, a A-phase amplitude of the three-level photovoltaic inverter is always clamped to $-V_{dc}/2$; when the space vector is rotated to a fourth big sector, the C-phase amplitude of the three-level photovoltaic inverter is always clamped to $V_{dc}/2$; when the space vector is rotated to a fifth big sector, the B-phase amplitude of the three-level photovoltaic inverter is always clamped to $-V_{dc}/2$; and when the space vector is rotated to a sixth big sector, the A-phase amplitude of the three-level photovoltaic inverter is always clamped to $V_{dc}/2$.

In the second discontinuous SVPWM mode, when the space vector corresponding to the instantaneous output voltage of the three-level photovoltaic inverter is rotated to a second half region of the first big sector or a first half region of the second big sector, the C-phase amplitude of the three-level photovoltaic inverter is always clamped to $-V_{dc}/2$; when the space vector is rotated to a second half region of the second big sector or a first half region of the third big sector, the B-phase amplitude of the three-level photovoltaic inverter is always clamped to $V_{dc}/2$; when the space vector is rotated to a second half region of the third big sector or a first half region of the fourth big sector, the A-phase amplitude of the three-level photovoltaic inverter is always clamped to $-V_{dc}/2$; when the space vector is rotated to a second half region of the fourth big sector or a first half region of the fifth big sector, the C-phase amplitude of the three-level photovoltaic inverter is always clamped to $V_{dc}/2$; when the space vector is rotated to a second half region of the fifth big sector or a first half region of the sixth big sector, the B-phase amplitude of the three-level photovoltaic inverter is always clamped to $-V_{dc}/2$; and when the space vector is rotated to a second half region of the sixth big sector or a first half region of the first big sector, the A-phase amplitude of the three-level photovoltaic inverter is always clamped to $V_{dc}/2$.

In the third discontinuous SVPWM mode, when the space vector corresponding to the instantaneous output voltage of the three-level photovoltaic inverter is rotated to the second big sector, the C-phase amplitude of the three-level photovoltaic inverter is always clamped to $-V_{dc}/2$; when the space vector is rotated to the third big sector, the B-phase amplitude of the three-level photovoltaic inverter is always clamped to $V_{dc}/2$; when the space vector is rotated to the fourth big sector, the A-phase amplitude of the three-level photovoltaic inverter is always clamped to $-V_{dc}/2$; when the space vector is rotated to the fifth big sector, the C-phase amplitude of the three-level photovoltaic inverter is always clamped to $V_{dc}/2$; when the space vector is rotated to the sixth big sector, the B-phase amplitude of the three-level photovoltaic inverter is always clamped to $-V_{dc}/2$; and when the space vector is rotated to the first big sector, the A-phase amplitude of the three-level photovoltaic inverter is always clamped to $V_{dc}/2$.

In the fourth discontinuous SVPWM mode, when the space vector corresponding to the instantaneous output voltage of the three-level photovoltaic inverter is rotated to the first half region of the first big sector or the second half region of the second big sector, the C-phase amplitude of the three-level photovoltaic inverter is always clamped to $-V_{dc}/2$; when the space vector is rotated to the first half region of the second big sector or the second half region of the third big sector, the B-phase amplitude of the three-level photovoltaic inverter is always clamped to $V_{dc}/2$; when the space vector is rotated to the first half region of the third big sector or the second half region of the fourth big sector, the A-phase amplitude of the three-level photovoltaic inverter is always clamped to $-V_{dc}/2$; when the space vector is rotated to the first half region of the fourth big sector or the second half region of the fifth big sector, the C-phase amplitude of the three-level photovoltaic inverter is always clamped to $V_{dc}/2$; when the space vector is rotated to the first half region of the fifth big sector or the second half region of the sixth big sector, the B-phase amplitude of the three-level photovoltaic inverter is always clamped to $-V_{dc}/2$; and when the space vector is rotated to the first half region of the sixth big sector or the second half region of the first big sector, the A-phase amplitude of the three-level photovoltaic inverter is always clamped to $V_{dc}/2$.

$V_{dc}$ is a direct current input voltage of the three-level photovoltaic inverter.

Optionally, before the switching the pulse width modulation mode of the three-level photovoltaic inverter to the 13-vector SVPWM mode in the case of detecting that the potential safety hazards exist in the three-level photovoltaic inverter, the method further includes setting the pulse width modulation mode of the three-level photovoltaic inverter to a discontinuous SVPWM mode.

A pulse width modulator for a three-level photovoltaic inverter includes:

a detecting unit configured to detect whether potential safety hazards exist in the three-level photovoltaic inverter; and a switching unit connected to the detecting unit and configured to switch a pulse width modulation mode of the three-level photovoltaic inverter to a 13-vector SVPWM mode in a case of detecting that the potential safety hazards exist in the three-level photovoltaic inverter. The 13-vector SVPWM mode is a SVPWM mode in which 12 short ones of 27 on-off state vectors of the three-level photovoltaic inverter are discarded and only 6 long vectors, 6 middle vectors and 3 zero vectors are reserved.

The detecting unit includes a first detecting unit configured to detect whether the effective value of the common mode leakage current of the three-level photovoltaic inverter is greater than the first threshold. The switching unit includes a first switching unit configured to switch the pulse width modulation mode of the three-level photovoltaic inverter to the 13-vector SVPWM mode in a case of detecting that the effective value of the common mode leakage current of the three-level photovoltaic inverter is greater than the first threshold.

The detecting unit includes a second detecting unit configured to detect whether the amplitude of the voltage on line side of the three-level photovoltaic inverter is less than the threshold for a low voltage ride-through. The switching unit includes a second switching unit configured to switch the pulse width modulation mode of the three-level photovoltaic inverter to the 13-vector SVPWM mode in a case of detecting that the amplitude of the voltage on line side of the three-level photovoltaic inverter is less than the threshold for the low voltage ride-through.

As can be seen from the above technical solutions, in a case of detecting that the potential safety hazards exist in the three-level photovoltaic inverter, the pulse width modulation mode of the three-level photovoltaic inverter is switched to the 13-vector SVPWM mode. In the 13-vector SVPWM mode, short vectors, which will otherwise cause faults or abnormal problems (such as a midpoint potential offset or an excessively large common mode leakage current formed when a ground stray capacitance of a photovoltaic assembly is large) in the three-level photovoltaic inverter, are discarded, and thus the problems existing in the conventional technology are solved effectively.

BRIEF DESCRIPTION OF THE DRAWINGS

The accompany drawings needed to be used in the description of the embodiments or the conventional technology are described briefly as follows, so that the technical solutions according to the embodiments in the present invention or according to the conventional technology become clearer. It is obvious that the accompany drawings in the following description are only some embodiments of the present invention. For those skilled in the art, other accompany drawings may be obtained according to these accompany drawings without any creative work.

DETAILED DESCRIPTION OF THE EMBODIMENTS

The technical solution according to the embodiments of the present invention will be described clearly and completely as follows in conjunction with the accompany drawings in the embodiments of the present invention. It is obvious that the described embodiments are only a part of the embodiments according to the present invention. All the other embodiments obtained by those skilled in the art based on the embodiments in the present invention without any creative work belong to the scope of the present invention.

Figure 1:
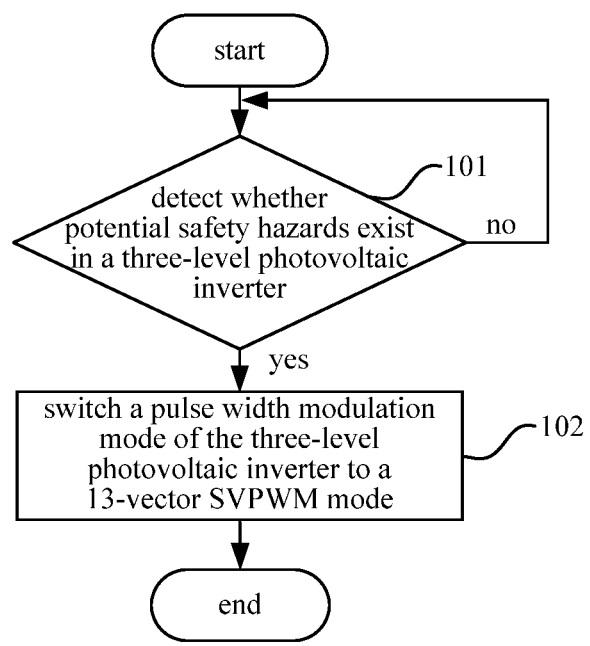
FIG. 1 is a flow chart of a pulse width modulation method for a three-level photovoltaic inverter according to an embodiment of the present invention.

Referring to FIG. 1, the present application provides a pulse width modulation method for a three-level photovoltaic inverter, for solving the faults or abnormal problems in the three-level photovoltaic inverter (such as a midpoint potential offset or an excessively large common mode leakage current formed when a ground stray capacitance of a photovoltaic assembly is large). The method includes the following steps 101 to 102.

In step 101, it is detected whether potential safety hazards exist in the three-level photovoltaic inverter. If the potential safety hazards exist in the three-level photovoltaic inverter, the process proceeds to step 102, otherwise, the process returns to step 101.

In step 102, a pulse width modulation mode of the three-level photovoltaic inverter is switched to the 13-vector SVPWM (Space Vector Pulse Width Modulation) mode. The 13-vector SVPWM mode is a SVPWM mode in which 12 short ones of 27 on-off state vectors of the three-level photovoltaic inverter are discarded and only 6 long vectors, 6 middle vectors and 3 zero vectors are reserved.

According to the embodiment, in the 13-vector SVPWM mode, short vectors, which will otherwise cause faults or abnormal problems (such as a midpoint potential offset or an excessively large common mode leakage current formed when a ground stray capacitance of a photovoltaic assembly is large) in the three-level photovoltaic inverter, are discarded, and thus the problems existing in the conventional technology are solved effectively. The scheme is described in detail hereinafter in terms of how to avoid an excessively large common mode leakage current and how to suppress a midpoint potential offset, so that those skilled can understand it easily.

(1) How to Avoid an Excessively Large Common Mode Leakage Current

Figure 2:
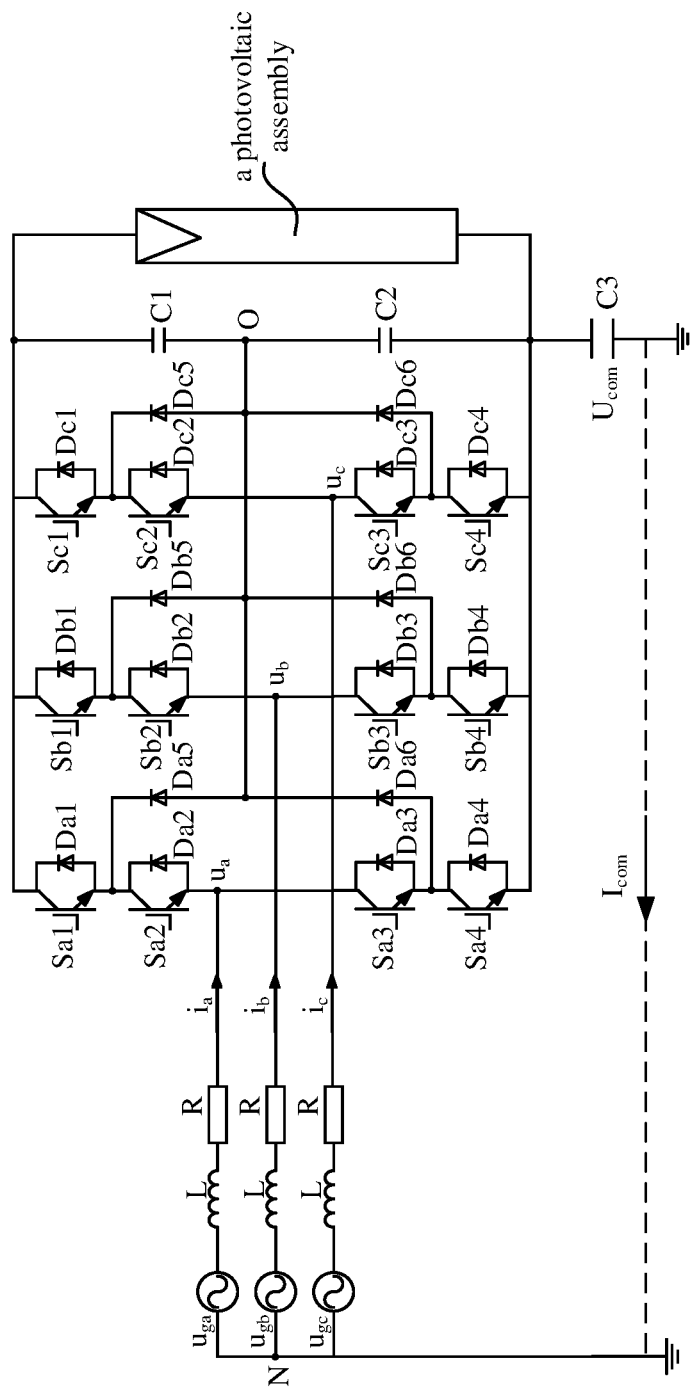
FIG. 2 is a schematic topological structure diagram of a three-level photovoltaic inverter according to an embodiment of the present invention.

The three-level photovoltaic inverter is a common energy conversion device adopted in a grid-connected photovoltaic power generation system, and it is used to convert a direct current outputted from a photovoltaic assembly into an alternating current and then send the alternating current to the power grid. The topological structure of the three-level photovoltaic inverter is shown in FIG. 2 (the three-level photovoltaic inverter has a large number of topological structures, only one of which is shown in this embodiment). A to-ground stray capacitance $C_3$ is formed between the photovoltaic assembly and a grounded shell. And when there is a direct electrical connection between the photovoltaic assembly and the power grid, the stray capacitance $C_3$, a power grid impedance and an output filter element of the three-level photovoltaic inverter form a common mode resonant loop.

The size of the stray capacitance $C_3$ is related to external environmental factors. When the photovoltaic assembly is in wet conditions such as rainy weather, the stray capacitance $C_3$ will be greater. An action of a power switch of the three-level photovoltaic inverter may cause variation in a common mode voltage $U_{com}$ on the stray capacitance $C_3$. And when the stray capacitance $C_3$ is relatively large, the varied common mode voltage $U_{com}$ on the stray capacitance $C_3$ may excite the common mode resonant circuit to produce a common mode leakage current $i_{com}$, which increases electromagnetic conduction losses of the grid-connected photovoltaic power generation system, reduces electromagnetic compatibilities and causes safety problems.

Figure 3:
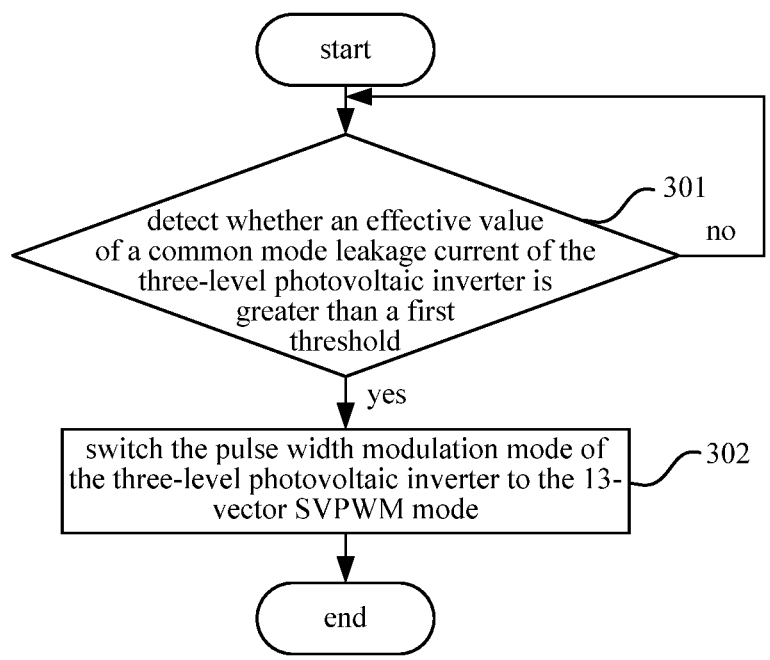
FIG. 3 is a flow chart of a pulse width modulation method for a three-level photovoltaic inverter for reducing an amplitude of a common mode voltage according to an embodiment of the present invention.

Considering that the common mode leakage current $i_{com}$ can be reduced by reducing the amplitude of the common mode voltage $U_{com}$, thus a series of problems caused by the common mode leakage current $i_{com}$ can be relieved effectively, a scheme is proposed for reducing the amplitude of the common mode voltage $U_{com}$ from a source which generates the common mode voltage $U_{com}$. Referring to FIG. 3, the method includes the follow steps 301 to 302.

In step 301, it is detected whether the effective value of the common mode leakage current of the three-level photovoltaic inverter is greater than the first threshold. If the effective value of the common mode leakage current of the three-level photovoltaic inverter is greater than the first threshold, the process proceeds to step 302, otherwise, the process returns to step 301.

In step 302, the pulse width modulation mode of the three-level photovoltaic inverter is switched to the 13-vector SVPWM mode.

The specific analysis of the scheme shown in FIG. 3 is as follows.

As known, the common mode voltage in a three-phase voltage source system is defined as a common component of a three-level output voltage relative to the reference ground, which is also known as a zero sequence voltage. In the three-level photovoltaic inverter shown in FIG. 2, based on Kirchhoff's voltage law, it is obtained that $$\begin{cases} u_a = u_{ga} - Ri_a - L\dfrac{di_a}{dt} + U_{com} \\ u_b = u_{gb} - Ri_b - L\dfrac{di_b}{dt} + U_{com} \\ u_c = u_{gc} - Ri_c - L\dfrac{di_c}{dt} + U_{com} \end{cases}.$$

In the above formula, $u_a$, $u_b$ and $u_c$ are a component of a A-phase output voltage relative to the reference ground, a component of a B-phase output voltage relative to the reference ground, and a component of a C-phase output voltage relative to the reference ground in the sequence listed, $u_{ga}$, $u_{gb}$ and $u_{gc}$ are the A-phase output voltage, the B-phase output voltage and the C-phase output voltage in the sequence listed, R is a impedance of the power grid, $i_a$, $i_b$ and $i_c$ are a A-phase output current, a B-phase output current and a C-phase output current in the sequence listed, L is an output filter element of the three-level photovoltaic inverter, and $U_{com}$ is a common mode voltage.

An approximate expression of the common mode voltage $U_{com}$ is obtained by adding the above three voltage equations as follows:

$$U_{com} = \dfrac{u_a + u_b + u_c}{3}.$$

It can be seen from the expression of the common mode voltage $U_{com}$, the common mode voltage produced by the three-level photovoltaic inverter is a high frequency hopping signal related to a switching frequency, a switching state and an amplitude of a direct current bus voltage. In the SVPWM mode, the output voltage of the three-level photovoltaic inverter and thus the variation of the common mode voltage $U_{com}$ are determined by a turn-off combination of the power switches. That is to say, the pulse width modulation process of the three-level photovoltaic inverter is the source of the common mode voltage $U_{com}$.

The SVPWM mode is a common pulse width modulation mode for the three-level photovoltaic inverter, and includes a continuous SVPWM mode and a discontinuous SVPWM mode. The principle of the SVPWM mode is as follows. A three-phase sinusoidal alternating voltage outputted by the three-level photovoltaic inverter is represented by a rotating space vector, and then an instantaneous value of the space vector is an instantaneous output voltage of the three-level photovoltaic inverter. A rotation space of the space vector is divided into several small sectors, and the instantaneous value of the space vector rotated to any of the small vectors may be obtained by synthesizing the switching state vectors of the three-level photovoltaic inverter at the boundary of the small sector, so that a magnitude and a direction of the instantaneous value of the space vector can be controlled by controlling an action time of the switching state vector involved in the synthesizing.

Each phase bridge arm of the three-level photovoltaic inverter has three switching states, and accordingly, the three-level photovoltaic inverter has $3^3=27$ switching states in total. The midpoint "0" of a direct bus capacitor is as zero level reference potential, and the positive bus voltage $+V_{dc}/2$ is defined as level 1, and the negative bus voltage $-V_{dc}/2$ is defined as level −1. So the three-level photovoltaic inverter has 27 switching state vectors in total, including 12 short vectors, 6 middle vectors, 6 long vectors and 3 zero vectors, and the switching state and the amplitude of the common mode voltage are shown in Table 1.

| the vector type | the amplitude of the common mode voltage | the switching state |
| --- | --- | --- |
| zero vector | 0 | (1 1 1), (0 0 0), (−1 −1 −1) |
| short vector | $V_{dc}/6$ | (0 1 0), (0 0 −1), (1 0 0), (0 −1 0), (0 0 1), (−1 0 0) |
|  | $V_{dc}/3$ | (0 −1 −1), (1 1 0), (−1 0 −1), (0 1 1), (−1 −1 0), (1 0 1) |
| middle vector | 0 | (1 0 −1), (0 1 −1), (−1 1 0), (−1 0 1), (0 −1 1), (1 −1 0) |
| long vector | $V_{dc}/6$ | (1 −1 −1), (1 1 −1), (−1 1 −1), (−1 1 1), (−1 −1 1), (1 −1 1) |

Table 1 correspondence table of the vector type, the amplitude of the common mode voltage and the switching state As can be seen from Table 1, the middle vectors and the zero vectors don't produce the common mode voltage, the amplitude of the common mode voltage produced by the long vectors is only $V_{dc}/6$, and the amplitude of the common mode voltage produced by some of the short vectors is large. In the SVPWM mode mentioned in background, all 27 switching state vectors are adopted, which causes more high-frequency common mode voltages. In the application, by discarding the short vectors which otherwise will produce the common mode voltage with relatively large amplitudes, a SVPWM mode with less high-frequency common mode voltages is provided, which is defined as the 13-vector SVPWM mode for ease of description.

Figure 4:
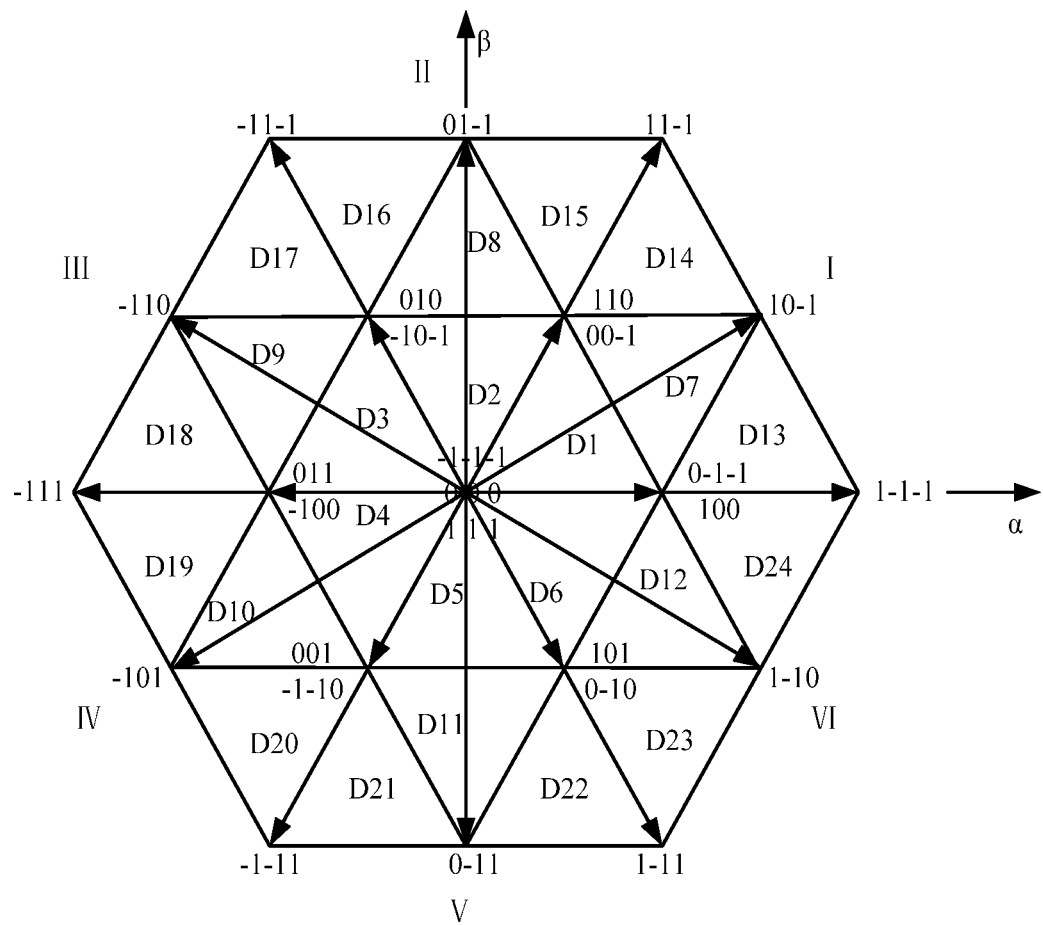
FIG. 4 is a space vector diagram of a three-level voltage in the conventional SVPWM mode.
Figure 5:
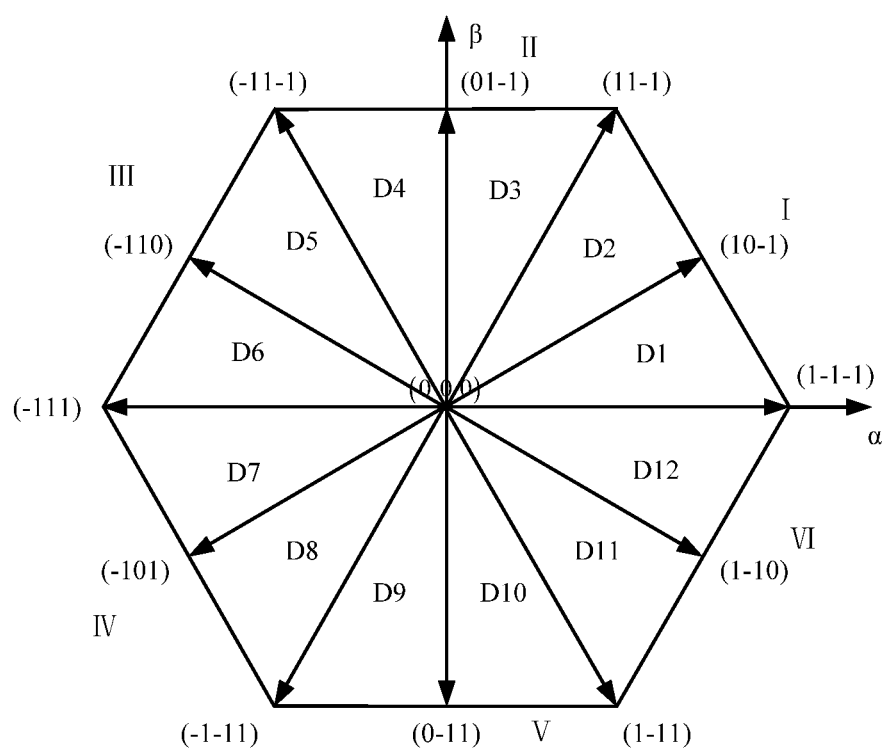
FIG. 5 is a space vector diagram of a three-level voltage in a 13-vector SVPWM mode according to an embodiment of the present invention.

A space vector diagram of the three-level voltage in the SVPWM mode mentioned in background is shown in FIG. 4 (the space vector diagram of the three-level voltage shown in FIG. 4 is divided equally into 6 large sectors by 6 long sectors, to obtain large sectors I to VI which start from a-axis and are distributed anticlockwise in the sequence listed. Then each large sector is divided equally into 4 small sectors, so 24 small sectors D1-D24 can be obtained. Assuming that the instantaneous value of the space vector when being rotated to the small sector D14 at a certain time, can be obtained by synthesizing (1 1 −1), (1 0 −1), (0 0 −1), and (1 1 0)). And a space vector diagram of the three-level voltage in the 13-vector SVPWM mode is shown in FIG. 5 (the space vector diagram of the three-level voltage shown in FIG. 5 is divided equally into 6 large sectors by 6 long vectors, to obtain large sectors I to VI which start from a-axis and are distributed anticlockwise in the sequence listed. Then each large sector is divided equally into 2 small sectors, so 24 small sectors D1-D12 can be obtained. Assuming that the instantaneous value of the space vector when being rotated to the small sector D2 at a certain time, can be obtained by synthesizing (1 1 −1), (1 0 −1), and (0 0 0)).

In general, in the scheme shown in FIG. 3, in the 13-vector SVPWM mode, only the 13 switching state vectors which don't cause too much impact on the amplitude of the common mode voltage $U_{com}$ are reserved, so when the ground stray capacitance $C_3$ is large, the common mode leakage current $i_{com}$ can be reduced, thereby alleviating increased system electromagnetic conduction losses, reduced electromagnetic compatibilities and safety problems caused by the common mode leakage current $i_{com}$.

Figure 6:
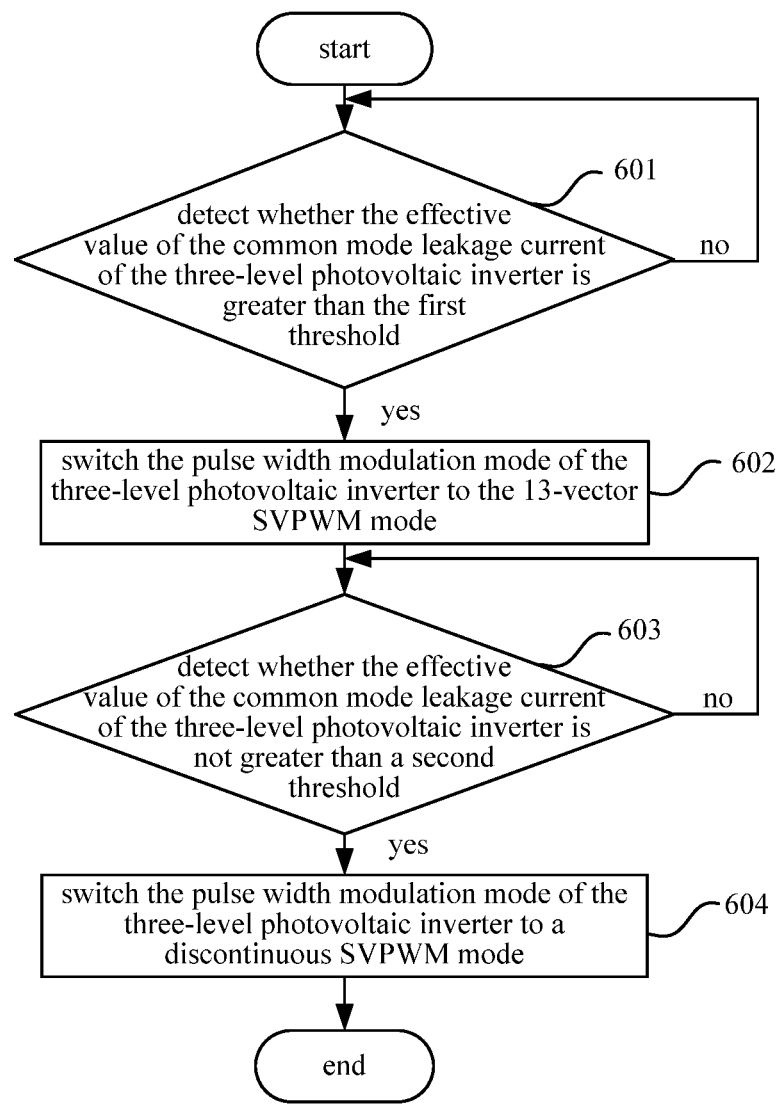
FIG. 6 is a flow chart of a pulse width modulation method for a three-level photovoltaic inverter for reducing an amplitude of a common mode voltage and switching losses of the inverter according to an embodiment of the present invention.

Furthermore, in an embodiment, to reduce the switching loss of the three-level photovoltaic inverter, a scheme is proposed based on the scheme as shown in FIG. 3, for reducing both the amplitude of the common mode voltage $U_{com}$ and the switching loss of the inverter. Referring to FIG. 6, the method includes the follow steps 601 to 604.

In step 601, it is detected whether the effective value of the common mode leakage current of the three-level photovoltaic inverter is greater than the first threshold. If the effective value of the common mode leakage current is greater than the first threshold, the process proceeds to step 602, otherwise, the process returns to step 601.

In step 602, the pulse width modulation mode of the three-level photovoltaic inverter is switched to the 13-vector SVPWM mode.

In step 603, it is detected whether the effective value of the common mode leakage current of the three-level photovoltaic inverter is not greater than the second threshold. If the effective value of the common mode leakage current is not greater than the second threshold, process proceeds to step 604, otherwise, the process returns to step 603.

In step 604, the pulse width modulation mode of the three-level photovoltaic inverter is switched to the discontinuous SVPWM mode. The second threshold is not greater than the first threshold. Preferably, a hysteresis interval is provided between the second threshold and the first threshold to prevent frequent switching between the two modulation modes in a critical condition.

The specific analysis of the scheme shown in FIG. 6 is as follows.

Figure 7:
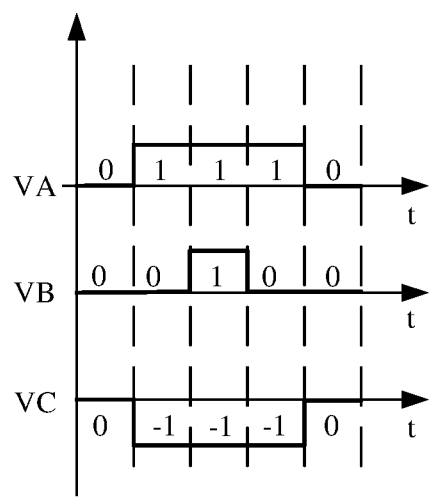
FIG. 7 is a diagram of a space vector sequence distribution when a space vector corresponding to an instantaneous output voltage of the three-level photovoltaic inverter is rotated to a small sector D2 shown in FIG. 5 in the 13-vector SVPWM mode.

The three-phase sinusoidal alternating voltage outputted by the three-level photovoltaic inverter is represented by a rotating space vector. Assuming that the instantaneous value of the space vector when being rotated to the small sector D2 shown in FIG. 5 at a certain time, and for less switching losses, each phase of power switch of the three-level photovoltaic inverter is required to act only two times within one switching cycle, as shown in FIG. 7.

Figure 8:
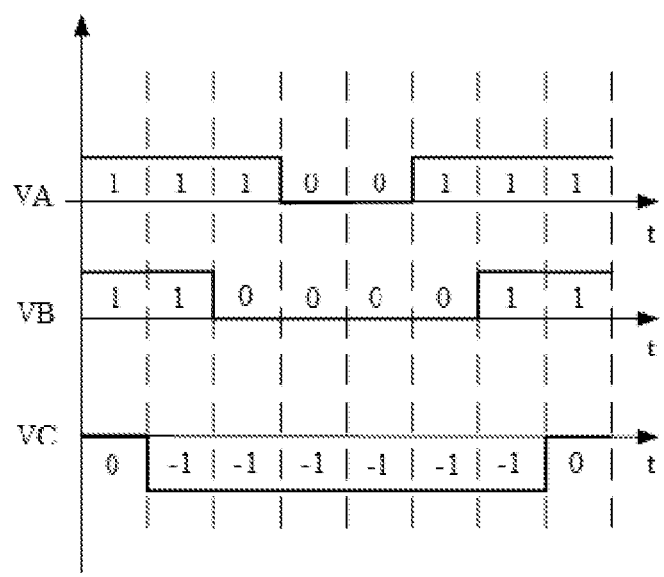
FIG. 8 is a diagram of a space vector sequence distribution when a space vector corresponding to an instantaneous output voltage of the three-level photovoltaic inverter is rotated to a small sector D14 shown in FIG. 4 in a continuous SVPWM mode.
Figure 9:
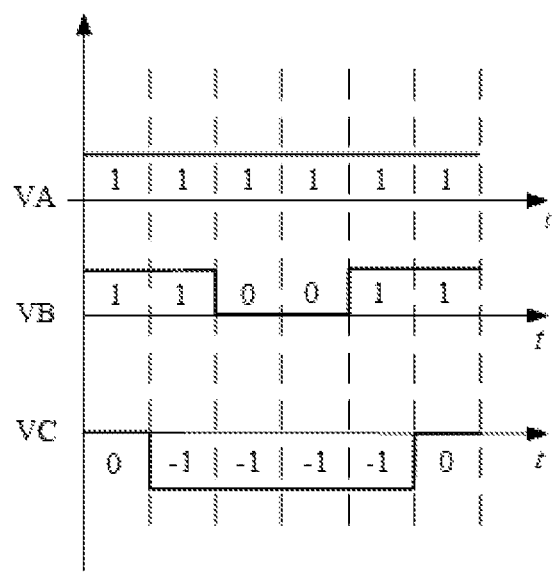
FIG. 9 is a diagram of a space vector sequence distribution when a space vector corresponding to an instantaneous output voltage of the three-level photovoltaic inverter is rotated to a small sector D14 shown in FIG. 4 in a discontinuous SVPWM mode.

Also assuming that the instantaneous value of the space vector rotates to the small sector D14 shown in FIG. 4 at a certain time, and for less switching losses, each phase of power switch of the three-level photovoltaic inverter may be required to act only two times within one switching cycle, as shown in FIG. 8. In this case, the modulation mode is referred to as the continuous SVPWM mode. However, considering that a vector (0 0 1) and a vector (1 1 0) represent a same short vector, if an action time of the vector (0 0 −1) is shifted to the vector (1 1 0), a distribution of the space vector sequence will became that shown in FIG. 9. With this, on a premise of ensuring that the action time the original space vector keeps constant, the A-phase power switch does not act, so as to eliminate the switching loss of the A-phase during a switching cycle. Similarly, an action time of the vector (1 1 0) is shifted to the vector (0 0 −1), so that the C-phase switch does not act in a switching cycle. In this case, the modulation mode is referred to as the discontinuous SVPWM mode.

In general, in the discontinuous SVPWM mode, the three-level photovoltaic inverter can maintain that a certain one phase of power switch does not act within a switching cycle and the other two phases of power switches act two times within a switching cycle. Compared to the continuous SVPWM mode and the 13-vector SVPWM mode, the switching loss in the discontinuous SVPWM mode is smaller. So, when the common mode leakage current of the three-level photovoltaic inverter is no longer excessively large, the modulation mode of the three-level photovoltaic inverter is switched to the discontinuous SVPWM mode, to further reduce the switching loss during the operation of the three-level photovoltaic inverter. And the switching back and forth between the two modulation modes can not only ensure a low common mode leakage current $i_{com}$, but also ensure low switching loss.

Specifically, the discontinuous SVPWM mode may include a first discontinuous SVPWM mode, a second discontinuous SVPWM mode, a third discontinuous SVPWM mode and a fourth discontinuous SVPWM mode (in FIGS. 10a to 10d, AP indicates that the A-phase amplitude of the three-level photovoltaic inverter is always clamped to $V_{dc}/2$, BP indicates that the B-phase amplitude of the three-level photovoltaic inverter is always clamped to $V_{dc}/2$, CP indicates that the C-phase amplitude of the three-level photovoltaic inverter is always clamped to $V_{dc}/2$, AN indicates that the A-phase amplitude of the three-level photovoltaic inverter is always clamped to $-V_{dc}/2$, BN indicates that the B-phase amplitude of the three-level photovoltaic inverter is always clamped to $-V_{dc}/2$, and CN indicates that the C-phase amplitude of the three-level photovoltaic inverter is always clamped to $-V_{dc}/2$. $V_{dc}$ is a direct current input voltage of the three-level photovoltaic inverter).

Figure 10A:
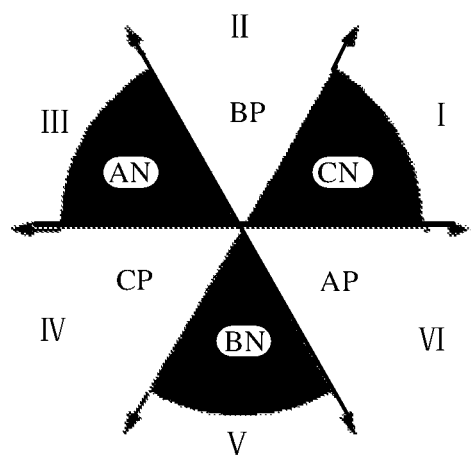
FIGS. 10a to 10d are amplitude clamping state diagrams of output voltages of the three-level photovoltaic inverter in four discontinuous SVPWM modes respectively.

As shown in FIG. 10a, in the first discontinuous SVPWM mode, when the space vector corresponding to the instantaneous output voltage of the three-level photovoltaic inverter is rotated to a first big sector (namely a big sector I), the C-phase amplitude of the three-level photovoltaic inverter is always clamped to $-V_{dc}/2$. When the space vector is rotated to a second big sector (namely a big sector II), the B-phase amplitude of the three-level photovoltaic inverter is always clamped to $V_{dc}/2$. When the space vector is rotated to a third big sector (namely a big sector III), the A-phase amplitude of the three-level photovoltaic inverter is always clamped to $-V_{dc}/2$. When the space vector is rotated to a fourth big sector (namely a big sector IV), the C-phase amplitude of the three-level photovoltaic inverter is always clamped to $V_{dc}/2$. When the space vector is rotated to a fifth big sector (namely a big sector V), the B-phase amplitude of the three-level photovoltaic inverter is always clamped to $-V_{dc}/2$. When the space vector is rotated to a sixth big sector (namely a big sector VI), the A-phase amplitude of the three-level photovoltaic inverter is always clamped to $V_{dc}/2$.

Figure 10B:
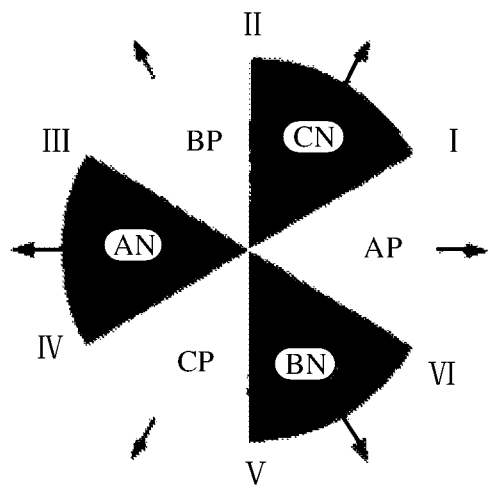

As shown in FIG. 10b, in the second discontinuous SVPWM mode, when the space vector corresponding to the instantaneous output voltage of the three-level photovoltaic inverter is rotated to a second half region of the first big sector or a first half region of the second big sector, the C-phase amplitude of the three-level photovoltaic inverter is always clamped to $-V_{dc}/2$. When the space vector is rotated to a second half region of the second big sector or a first half region of the third big sector, the B-phase amplitude of the three-level photovoltaic inverter is always clamped to $V_{dc}/2$. When the space vector is rotated to a second half region of the third big sector or a first half region of the fourth big sector, the A-phase amplitude of the three-level photovoltaic inverter is always clamped to $-V_{dc}/2$. When the space vector is rotated to a second half region of the fourth big sector or a first half region of the fifth big sector, the C-phase amplitude of the three-level photovoltaic inverter is always clamped to $V_{dc}/2$. When the space vector is rotated to a second half region of the fifth big sector or a first half region of the sixth big sector, the B-phase amplitude of the three-level photovoltaic inverter is always clamped to $-V_{dc}/2$. When the space vector is rotated to a second half region of the sixth big sector or the first half region of the first big sector, the A-phase amplitude of the three-level photovoltaic inverter is always clamped to $V_{dc}/2$.

Figure 10C:
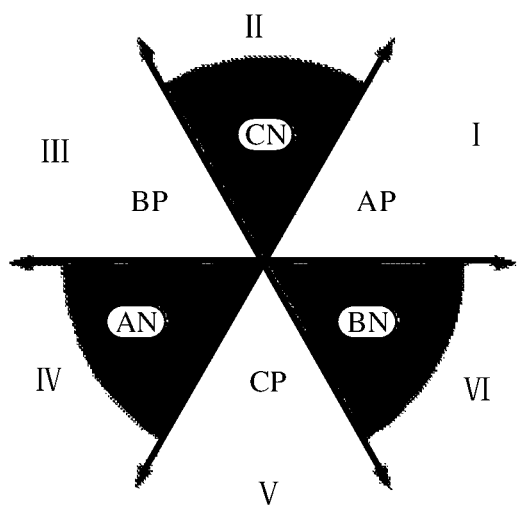

As shown in FIG. 10c, in the third discontinuous SVPWM mode, when the space vector corresponding to the instantaneous output voltage of the three-level photovoltaic inverter is rotated to the second big sector, the C-phase amplitude of the three-level photovoltaic inverter is always clamped to $-V_{dc}/2$. When the space vector is rotated to the third big sector, the B-phase amplitude of the three-level photovoltaic inverter is always clamped to $V_{dc}/2$. When the space vector is rotated to the fourth big sector, the A-phase amplitude of the three-level photovoltaic inverter is always clamped to $-V_{dc}/2$. When the space vector is rotated to the fifth big sector, the C-phase amplitude of the three-level photovoltaic inverter is always clamped to $V_{dc}/2$. When the space vector is rotated to the sixth big sector, the B-phase amplitude of the three-level photovoltaic inverter is always clamped to $-V_{dc}/2$. When the space vector is rotated to the first big sector, the A-phase amplitude of the three-level photovoltaic inverter is always clamped to $V_{dc}/2$.

Figure 10D:
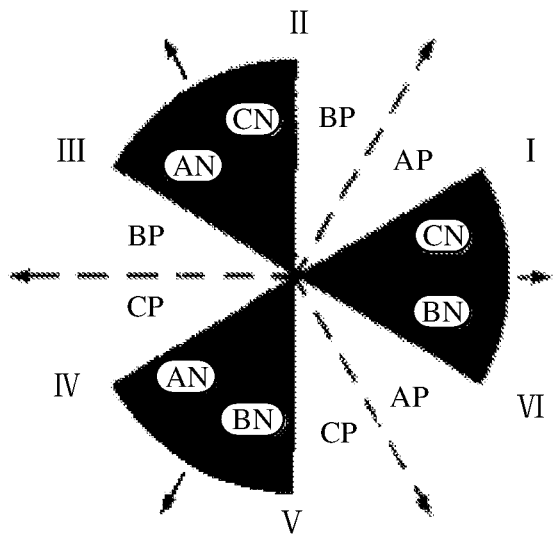

As shown in FIG. 10d, in the fourth discontinuous SVPWM mode, when the space vector corresponding to the instantaneous output voltage of the three-level photovoltaic inverter is rotated to the first half region of the first big sector or the second half region of the second big sector, the C-phase amplitude of the three-level photovoltaic inverter is always clamped to $-V_{dc}/2$. When the space vector is rotated to the first half region of the second big sector or the second half region of the third big sector, the B-phase amplitude of the three-level photovoltaic inverter is always clamped to $V_{dc}/2$. When the space vector is rotated to the first half region of the third big sector or the second half region of the fourth big sector, the A-phase amplitude of the three-level photovoltaic inverter is always clamped to $-V_{dc}/2$. When the space vector is rotated to the first half region of the fourth big sector or the second half region of the fifth big sector, the C-phase amplitude of the three-level photovoltaic inverter is always clamped to $V_{dc}/2$. When the space vector is rotated to the first half region of the fifth big sector or the second half region of the sixth big sector, the B-phase amplitude of the three-level photovoltaic inverter is always clamped to $-V_{dc}/2$. When the space vector is rotated to the first half region of the sixth big sector or the second half region of the first big sector, the A-phase amplitude of the three-level photovoltaic inverter is always clamped to $V_{dc}/2$.

Furthermore, preferably, before step 301 shown in FIG. 3 or step 601 shown in FIG. 6, the method further includes: in a case of detecting that the effective value of the common mode leakage current of the three-level photovoltaic inverter is greater than a third threshold, the three-level photovoltaic inverter is triggered to shut down for protection (which is not shown in FIGS. 3 and 6), to prevent the common mode leakage current overflowing and protect the three-level photovoltaic inverter.

As can be seen from the above description with respect to (1), in the embodiment, in a case of detecting that the common mode current of the three-level photovoltaic inverter is to overflow, the pulse width modulation mode of the three-level photovoltaic inverter is switched to the 13-vector SVPWM mode. In the 13-vector SVPWM mode, short vectors which will otherwise cause increased the common mode leakage current are discarded, and thus the problems are solved, such as excessively large common mode leakage current due to large ground stray capacitance of the photovoltaic assembly.

(2) How to Suppress Midpoint Potential Offset

The low voltage ride-through of the three-level photovoltaic inverter is that when the voltage of the power grid drops due to failure or disturbance of the power grid, the three-level photovoltaic inverter can operate continuously in a grid-connected mode, and output a certain reactive current in accordance with the standard. However, in the SVPWM mode mentioned in background, due to the short vectors, the midpoint potential offset occurs in the three-level photovoltaic inverter when the voltage of the power grid drops, resulting in a threat to the reliable operation of the photovoltaic grid-connected power generation system.

Figure 11:
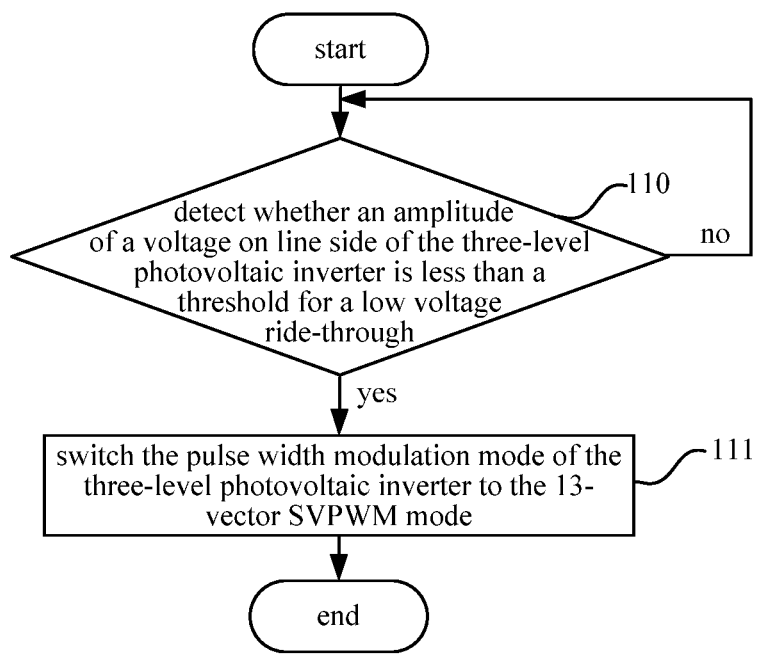
FIG. 11 is a flow chart of a pulse width modulation method for a three-level photovoltaic inverter for suppressing a midpoint potential offset according to an embodiment of the present invention.

Considering that among the 27 switching state vectors (including 12 short vectors, 6 middle vectors, 6 long vectors and 3 zero vectors) in the SVPWM mode mentioned in background, only the 12 short vectors will cause the midpoint potential offset, so a method is proposed for effectively suppressing the midpoint potential offset. Referring to FIG. 11, the method includes the follow steps 110 to 111.

In step 110, it is detected whether an amplitude of a voltage on line side of the three-level photovoltaic inverter is less than a threshold for the low voltage ride-through. If the amplitude of the voltage on line side is less than the threshold for the low voltage ride-through, the process proceeds to step 111, otherwise, the process returns to step 110.

In step 111, the pulse width modulation mode of the three-level photovoltaic inverter is switched to the 13-vector SVPWM mode.

As shown in FIG. 11, in a case of detecting that the midpoint potential offset will occur in the three-level photovoltaic inverter, the pulse width modulation mode of the three-level photovoltaic inverter is switched to the 13-vector SVPWM mode. In the 13-vector SVPWM mode, short vectors which will otherwise cause the midpoint potential offset are discarded, and thus the midpoint potential offset is suppressed effectively.

Figure 12:
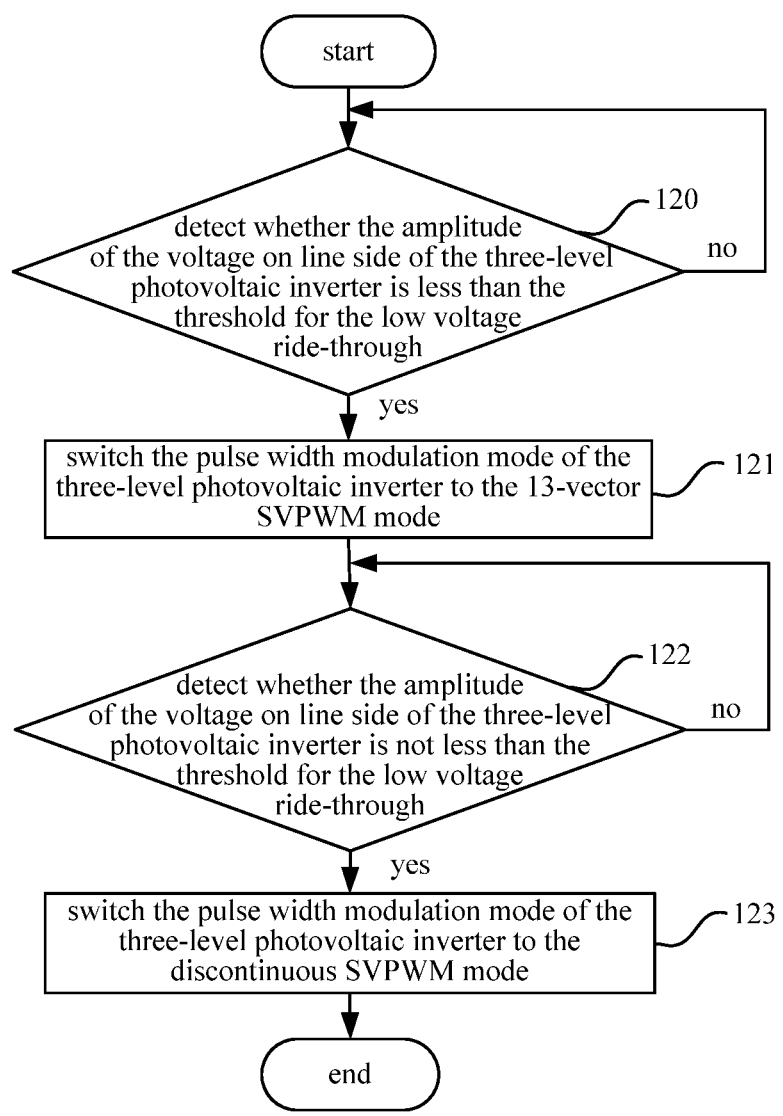
FIG. 12 is a flow chart of a pulse width modulation method for a three-level photovoltaic inverter for suppressing a midpoint potential offset and reducing switching losses of the inverter according to an embodiment of the present invention.

Furthermore, in an embodiment, to reduce the switching loss of the three-level photovoltaic inverter, a scheme is proposed based on the scheme as shown in FIG. 11, for not only suppressing effectively the midpoint potential offset but also reducing the switching loss. Referring to FIG. 12, the method includes the follow steps 120 to 123.

In step 120, it is detected whether the amplitude of the voltage on line side of the three-level photovoltaic inverter is less than the threshold for the low voltage ride-through. If the amplitude of the voltage on line side is less than the threshold for the low voltage ride-through, the process proceeds to step 121, otherwise, the process returns to step 120.

In step 121, the pulse width modulation mode of the three-level photovoltaic inverter is switched to the 13-vector SVPWM mode.

In step 122, it is detect whether the amplitude of the voltage on line side of the three-level photovoltaic inverter is not less than the threshold for the low voltage ride-through. If the amplitude of the voltage on line side is not less than the threshold for the low voltage ride-through, the process proceeds to step 123, otherwise, the process returns to step 122.

In step 123, the pulse width modulation mode of the three-level photovoltaic inverter is switched to the discontinuous SVPWM mode.

Switching back and forth between the two modulation modes can not only suppress the midpoint potential offset but also reduce the switch loss.

As can be seen from the above description with respect to (2), in the embodiment, in a case of detecting that the problem of midpoint potential offset is to occur in the three-level photovoltaic inverter, the pulse width modulation mode of the three-level photovoltaic inverter is switched to the 13-vector SVPWM mode. In the 13-vector SVPWM mode, short vectors which otherwise will cause the midpoint potential offset are discarded, and thus the midpoint potential offset are suppressed effectively.

It should be noted that, considering that the switch losses are reduced in the discontinuous SVPWM mode, in order to realize an optimal effect, the pulse width modulation mode of the initial three-level photovoltaic inverter is set to the discontinuous SVPWM mode. That is to say, before step 101, the pulse width modulation mode of the three-level photovoltaic inverter is set to the discontinuous SVPWM mode.

Figure 13:
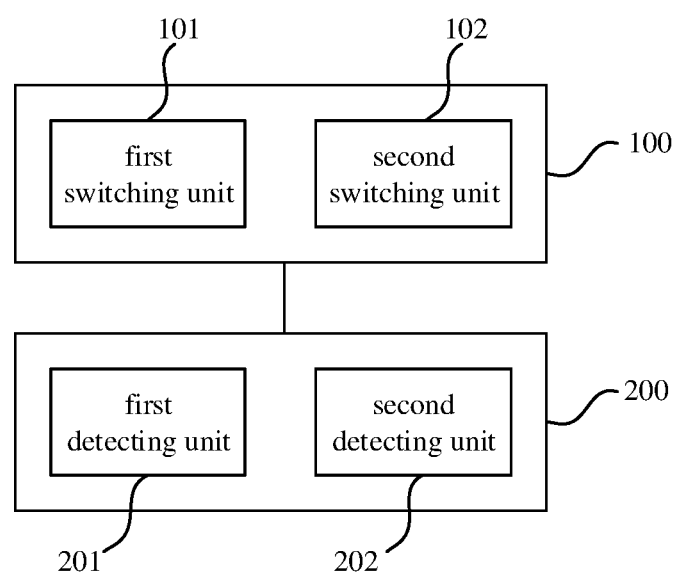
FIG. 13 is a schematic structural diagram of a pulse width modulator for a three-level photovoltaic inverter according to an embodiment of the present invention.

Based on the above pulse width modulation method for the three-level photovoltaic inverter, the present application provides a pulse width modulator for a three-level photovoltaic inverter. Referring to FIG. 13, the pulse width modulator for a three-level photovoltaic inverter includes a detecting unit 100 and a switching unit 200.

Still referring to FIG. 13, the detecting unit 100 is configured to detect whether potential safety hazards exist in the three-level photovoltaic inverter.

The switching unit 200 is connected to the detecting unit 100, and is configured to switch a pulse width modulation mode of the three-level photovoltaic inverter to a 13-vector SVPWM mode in a case of detecting that the potential safety hazards exist in the three-level photovoltaic inverter. The 13-vector SVPWM mode is a SVPWM mode in which 12 short ones of 27 on-off state vectors of the three-level photovoltaic inverter are discarded and only 6 long vectors, 6 middle vectors and 3 zero vectors are reserved.

Still referring to FIG. 13, the detecting unit 100 includes a first detecting unit 101 configured to detect whether an effective value of the common mode leakage current of the three-level photovoltaic inverter is greater than the first threshold. The switching unit 200 includes a first switching unit 201 configured to switch the pulse width modulation mode of the three-level photovoltaic inverter to the 13-vector SVPWM mode in a case of detecting that the effective value of the common mode leakage current of the three-level photovoltaic inverter is greater than the first threshold.

Still referring to FIG. 13, the detecting unit 100 includes a second detecting unit 102 configured to detect whether the amplitude of the voltage on line side of the three-level photovoltaic inverter is less than the threshold for the low voltage ride-through. The switching unit 200 includes a second switching unit 202 configured to switch the pulse width modulation mode of the three-level photovoltaic inverter to the 13-vector SVPWM mode in a case of detecting that the amplitude of the voltage on line side of the three-level photovoltaic inverter is less than the threshold for the low voltage ride-through.

In general, in the application, in a case of detecting that the potential safety hazards exist in the three-level photovoltaic inverter, the pulse width modulation mode of the three-level photovoltaic inverter is switched to the 13-vector SVPWM mode. In the 13-vector SVPWM mode, short vectors, which will otherwise cause faults or abnormal problems (such as a midpoint potential offset or an excessively large common mode leakage current formed when a ground stray capacitance of a photovoltaic assembly is large) in the three-level photovoltaic inverter, are discarded, and thus the problems existing in the conventional technology are solved effectively.

The embodiments of the present invention are described herein in a progressive manner, with an emphasis placed on explaining the difference between each embodiment and the other embodiments; hence, for the same or similar parts among the embodiments, they can be referred to from one another. For the modulator disclosed in the embodiments, the corresponding descriptions are relatively simple because the modulator corresponds to the methods disclosed in the embodiments. The relevant portions may be referred to the description for the method parts.

The above description of the embodiments disclosed herein enables those skilled in the art to implement or use the present invention. Numerous modifications to the embodiments will be apparent to those skilled in the art, and the general principle herein can be implemented in other embodiments without deviation from the spirit or scope of the embodiments of the present invention. Therefore, the present invention will not be limited to the embodiments described herein, but in accordance with the widest scope consistent with the principle and novel features disclosed herein.

The invention claimed is:

1. A pulse width modulation method for a three-level photovoltaic inverter, comprising:
    switching a pulse width modulation mode of the three-level photovoltaic inverter to a 13-vector space vector pulse width modulation SVPWM mode in a case of detecting that potential safety hazards exist in the three-level photovoltaic inverter,
    wherein the 13-vector SVPWM mode is a SVPWM mode in which 12 short ones of 27 on-off state vectors of the three-level photovoltaic inverter are discarded and only 6 long vectors, 6 middle vectors and 3 zero vectors are reserved.

2. The method according to claim 1, wherein the detecting that the potential safety hazards exist in the three-level photovoltaic inverter, comprises detecting that an effective value of a common mode leakage current of the three-level photovoltaic inverter is greater than a first threshold.

3. The method according to claim 2, wherein after the switching the pulse width modulation mode of the three-level photovoltaic inverter to the 13-vector SVPWM mode, the method further comprises:
    switching the pulse width modulation mode of the three-level photovoltaic inverter to a discontinuous SVPWM mode in a case of detecting that the effective value of the common mode leakage current of the three-level photovoltaic inverter is not greater than a second threshold, wherein the second threshold is not greater than the first threshold.

4. The method according to claim 3, wherein
    the discontinuous SVPWM mode comprises a first discontinuous SVPWM mode, a second discontinuous SVPWM mode, a third discontinuous SVPWM mode or a fourth discontinuous SVPWM mode, wherein
    in the first discontinuous SVPWM mode,
        when a space vector corresponding to an instantaneous output voltage of the three-level photovoltaic inverter is rotated to a first big sector, a C-phase amplitude of the three-level photovoltaic inverter is always clamped to $-V_{dc}/2$;

when the space vector is rotated to a second big sector, a B-phase amplitude of the three-level photovoltaic inverter is always clamped to $V_{dc}/2$;

when the space vector is rotated to a third big sector, a A-phase amplitude of the three-level photovoltaic inverter is always clamped to $-V_{dc}/2$;

when the space vector is rotated to a fourth big sector, the C-phase amplitude of the three-level photovoltaic inverter is always clamped to $V_{dc}/2$;

when the space vector is rotated to a fifth big sector, the B-phase amplitude of the three-level photovoltaic inverter is always clamped to $-V_{dc}/2$; and when the space vector is rotated to a sixth big sector, the A-phase amplitude of the three-level photovoltaic inverter is always clamped to $V_{dc}/2$;

in the second discontinuous SVPWM mode, when the space vector corresponding to the instantaneous output voltage of the three-level photovoltaic inverter is rotated to a second half region of the first big sector or a first half region of the second big sector, the C-phase amplitude of the three-level photovoltaic inverter is always clamped to $-V_{dc}/2$;

when the space vector is rotated to a second half region of the second big sector or a first half region of the third big sector, the B-phase amplitude of the three-level photovoltaic inverter is always clamped to $V_{dc}/2$;

when the space vector is rotated to a second half region of the third big sector or a first half region of the fourth big sector, the A-phase amplitude of the three-level photovoltaic inverter is always clamped to $-V_{dc}/2$;

when the space vector is rotated to a second half region of the fourth big sector or a first half region of the fifth big sector, the C-phase amplitude of the three-level photovoltaic inverter is always clamped to $V_{dc}/2$;

when the space vector is rotated to a second half region of the fifth big sector or a first half region of the sixth big sector, the B-phase amplitude of the three-level photovoltaic inverter is always clamped to $-V_{dc}/2$; and when the space vector is rotated to a second half region of the sixth big sector or a first half region of the first big sector, the A-phase amplitude of the three-level photovoltaic inverter is always clamped to $V_{dc}/2$;

in the third discontinuous SVPWM mode, when the space vector corresponding to an instantaneous output voltage of the three-level photovoltaic inverter is rotated to the second big sector, the C-phase amplitude of the three-level photovoltaic inverter is always clamped to $-V_{dc}/2$;

when the space vector is rotated to the third big sector, the B-phase amplitude of the three-level photovoltaic inverter is always clamped to $V_{dc}/2$;

when the space vector is rotated to the fourth big sector, the A-phase amplitude of the three-level photovoltaic inverter is always clamped to $-V_{dc}/2$;

when the space vector is rotated to the fifth big sector, the C-phase amplitude of the three-level photovoltaic inverter is always clamped to $V_{dc}/2$;

when the space vector is rotated to the sixth big sector, the B-phase amplitude of the three-level photovoltaic inverter is always clamped to $-V_{dc}/2$; and when the space vector is rotated to the first big sector, the A-phase amplitude of the three-level photovoltaic inverter is always clamped to $V_{dc}/2$; and in the fourth discontinuous SVPWM mode, when the space vector corresponding to the instantaneous output voltage of the three-level photovoltaic inverter is rotated to the first half region of the first big sector or the second half region of the second big sector, the C-phase amplitude of the three-level photovoltaic inverter is always clamped to $-V_{dc}/2$;

when the space vector is rotated to the first half region of the second big sector or the second half region of the third big sector, the B-phase amplitude of the three-level photovoltaic inverter is always clamped to $V_{dc}/2$;

when the space vector is rotated to the first half region of the third big sector or the second half region of the fourth big sector, the A-phase amplitude of the three-level photovoltaic inverter is always clamped to $-V_{dc}/2$;

when the space vector is rotated to the first half region of the fourth big sector or the second half region of the fifth big sector, the C-phase amplitude of the three-level photovoltaic inverter is always clamped to $V_{dc}/2$;

when the space vector is rotated to the first half region of the fifth big sector or the second half region of the sixth big sector, the B-phase amplitude of the three-level photovoltaic inverter is always clamped to $-V_{dc}/2$; and when the space vector is rotated to the first half region of the sixth big sector or the second half region of the first big sector, the A-phase amplitude of the three-level photovoltaic inverter is always clamped to $V_{dc}/2$, wherein $V_{dc}$ is a direct current input voltage of the three-level photovoltaic inverter.

5. The method according to claim 2, wherein before the switching the pulse width modulation mode of the three-level photovoltaic inverter to the 13-vector SVPWM mode in the case of detecting that the potential safety hazards exist in the three-level photovoltaic inverter, the method further comprises:

triggering the three-level photovoltaic inverter to shut down for protection in a case of detecting that the common mode leakage current value of the three-level photovoltaic inverter is greater than a third threshold.

6. The method according to claim 1, wherein the detecting that the potential safety hazards exist in the three-level photovoltaic inverter, comprises detecting that an amplitude of a voltage on line side of the three-level photovoltaic inverter is less than a threshold for a low voltage ride-through.

7. The method according to claim 6, wherein after the switching the pulse width modulation mode of the three-level photovoltaic inverter to the 13-vector SVPWM mode, the method further comprises:

switching the pulse width modulation mode of the three-level photovoltaic inverter to a discontinuous SVPWM mode in a case of detecting that the amplitude of the voltage on line side of the three-level photovoltaic inverter is not less than the threshold for the low voltage ride-through.

8. The method according to claim 1, wherein before the switching the pulse width modulation mode of the three-level photovoltaic inverter to the 13-vector SVPWM mode in the case of detecting that the potential safety hazards exist in the three-level photovoltaic inverter, the method further comprises:

setting the pulse width modulation mode of the three-level photovoltaic inverter to a discontinuous SVPWM mode.

9. A pulse width modulator for a three-level photovoltaic inverter, comprising:
- a detecting unit configured to detect whether potential safety hazards exist in the three-level photovoltaic inverter; and
- a switching unit connected to the detecting unit and configured to switch a pulse width modulation mode of the three-level photovoltaic inverter to a 13-vector SVPWM mode in a case of detecting that the potential safety hazards exist in the three-level photovoltaic inverter,
- wherein the 13-vector SVPWM mode is a SVPWM mode in which 12 short ones of 27 on-off state vectors of the three-level photovoltaic inverter are discarded and only 6 long vectors, 6 middle vectors and 3 zero vectors are reserved.

10. The modulator according to claim 9, wherein
the detecting unit comprises a first detecting unit configured to detect whether an effective value of a common mode leakage current of the three-level photovoltaic inverter is greater than a first threshold; and
the switching unit comprises a first switching unit configured to switch the pulse width modulation mode of the three-level photovoltaic inverter to the 13-vector SVPWM mode in a case of detecting that the effective value of the common mode leakage current of the three-level photovoltaic inverter is greater than the first threshold.

11. The modulator according to claim 9, wherein
the detecting unit comprises a second detecting unit configured to detect whether an amplitude of a voltage on line side of the three-level photovoltaic inverter is less than a threshold for a low voltage ride-through; and
the switching unit comprises a second switching unit configured to switch the pulse width modulation mode of the three-level photovoltaic inverter to the 13-vector SVPWM mode in a case of detecting that the amplitude of the voltage on line side of the three-level photovoltaic inverter is less than the threshold for the low voltage ride-through.

* * * * *